United States Patent [19]

D'Entremont et al.

[11] Patent Number: 5,055,726

[45] Date of Patent: Oct. 8, 1991

[54] PLUG-ON PROTECTOR FOR COMPRESSOR MOTOR

[75] Inventors: John R. D'Entremont, Foxboro, Mass.; Joseph G. Nield, Jr., Cumberland, R.I.

[73] Assignee: Texas Instruments Incorporated, Dallas, Tex.

[21] Appl. No.: 608,127

[22] Filed: Nov. 1, 1990

[51] Int. Cl.[5] .................... H02H 5/04; H02H 7/085; H01H 37/02; H02K 11/00

[52] U.S. Cl. .................... 310/71; 310/68 C; 337/299; 361/24; 439/679

[58] Field of Search .................... 310/68 C, 71; 337/3, 337/4, 5, 6, 26, 102; 361/23, 24, 25, 26; 439/685, 679

[56] References Cited

U.S. PATENT DOCUMENTS 4,042,860 8/1977 Pejouhy et al. .................... 337/102
4,241,370 12/1980 De Phillipis et al. .................... 361/24
4,252,394 2/1981 De Philippis et al. .................... 361/24
4,295,114 10/1981 Carlson .................... 337/299
4,472,705 9/1984 Pohl .................... 337/3
4,527,142 7/1985 Miller .................... 310/68 C
4,713,717 12/1987 Woods et al. .................... 310/68 C

*Primary Examiner*—Steven L. Stephan
*Assistant Examiner*—D. L. Rebsch
*Attorney, Agent, or Firm*—John A. Haug; James P. McAndrews; Melvin Sharp

[57] ABSTRACT

Electrical terminal pins (start, main and common) mounted in a glass header to provide electrical connection to a compressor motor are shown with a motor protector disposed on one of the pins in such a fashion that opposite-direction-oriented right angle female flag quick connectors are required for the start and main terminals, thereby avoiding the possibility of miswiring the terminal pins. The opening temperature of the motor protector is adjustable and the protector has a fail safe mechanism to avoid subjecting the motor to over-temperature conditions.

9 Claims, 5 Drawing Sheets

PLUG-ON PROTECTOR FOR COMPRESSOR MOTOR

BACKGROUND OF THE INVENTION

1. Field of the Invention

This invention relates to single phase motors having an auxiliary or start winding and a main winding.

2. Brief Description of the Prior Art

Air conditioning apparatus include hermetically sealed compressors typically powered by single phase electric motors. The motors are disposed within the compressor shell and electrically energized through pins mounted to extend through a glass header placed in the wall of the compressor shell. The motors are generally provided with a winding circuit which includes a main winding and an auxiliary or start winding connected in parallel with the main winding. During motor starting and running both the main winding and the start winding are connected across the motor power source to magnetically excite the rotor and cause rotation thereof.

It is conventional to place a capacitor in series with the start winding to alter the phase angle and achieve desired starting torque and running efficiency. The capacitor is connected outside the compressor shell to appropriate pins.

Although it is known to place a motor protector within the compressor shell, which provides certain advantages, such as being more responsive to motor winding temperature, it is most frequently preferred to place the protector outside the compressor shell, electrically interposing it between one line and the common pin because it is less expensive, and doing so facilitates field servicing.

A typical room air conditioning compressor is provided with a glass header arrangement as shown in FIG. 1 having three electrical terminal pins, start, main and common equidistantly spaced from one another. Male spade connectors are welded to the pins to facilitate connection to wire leads by conventional female flag quick connectors as shown in FIG. 2.

This arrangement, while being conducive to easy assembly, permits placement of wire leads on the terminal pins in an incorrect sequence which can result in malfunction of the motor. Improper wiring connections are very undesirable, particularly with rotary compressors.

It is an object of the present invention to provide structure which prevents miswiring. Another object of the invention is the provision of a simple, inexpensive yet reliable apparatus which will ensure that correct wiring connections are made to the electrical terminal pins of a compressor motor. Another object is the provision of a motor protector particularly adapted to prevent miswiring, one which is easily calibratable and one which is fail safe in operation.

Briefly, in accordance with the invention, in a first embodiment a keyed plug on motor protector is received on the common terminal pin, with the motor protector housing occupying the majority of the space which the pins define. First and second right angle female flag quick connectors, being mirror images of one another, to provide polarized or right and left hand orientations are then used to connect to the start and main terminal pins with the first connector receivable on only one of the start and main terminal pins and the second connector receivable on only the other of the start and main terminal pins.

The motor protector is provided with a female quick connector having a size selected so that it is receivable only on the spade terminal welded to the common pin. The spade terminal is chosen to be slightly smaller than the spade terminals welded to the main and start pins. The female quick connector of the motor protector, according to a feature of the invention, has an arm which, using a solder which melts at a selected temperature, is soldered to a support member which mounts an end of a current carrying thermostat member. The arm is adapted to spring away from the support member and interrupt the circuit in the event that a selected overtemperature occurs, thereby melting the solder. Calibration of the opening temperature of the motor protector is provided by a calibration screw aligned with a selected portion of the thermostat member.

In a second embodiment of the invention a pair of protrusions are formed on the motor protector housing adapted to project toward the main and start pins when the motor protector is mounted on its blade terminal in order to prevent placement of polarized female quick connectors on improper pins.

DESCRIPTION OF THE PREFERRED EMBODIMENT

Figure 1:
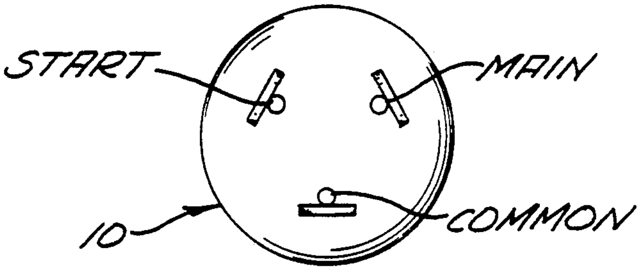
FIG. 1 is a top view of a typical terminal pin header of a compressor motor.
Figure 2:
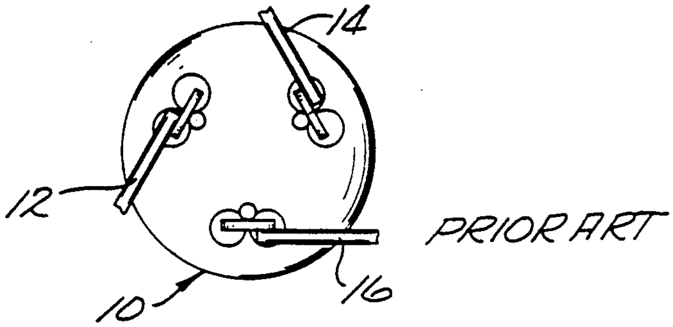
FIG. 2 is similar to FIG. 1 but shows a typical arrangement of wire leads connected to the terminal pins.

As noted above, FIG. 1 shows a typical glass header 10 which is mounted in a wall of a compressor shell (not shown) comprising start, main and common terminal pins spaced equidistantly from one another and each having a male spade connector welded thereto. FIG. 2 shows a conventional wiring arrangement with electrical leads 12, 14 and 16 connected respectively to the start, main and common terminals through female flag quick connectors in which the lead wire extends laterally from the side of the quick connector and perpendicularly to the longitudinal axis of the connector opening which receives a mating spade connector, i.e., a so called right angle connector. Although the female connectors can very easily be placed over the spade connectors to effect electrical connection it will be seen that it is also very easy to connect a given lead wire to any one of the spade connectors so that miswiring becomes a problem.

Figure 3:
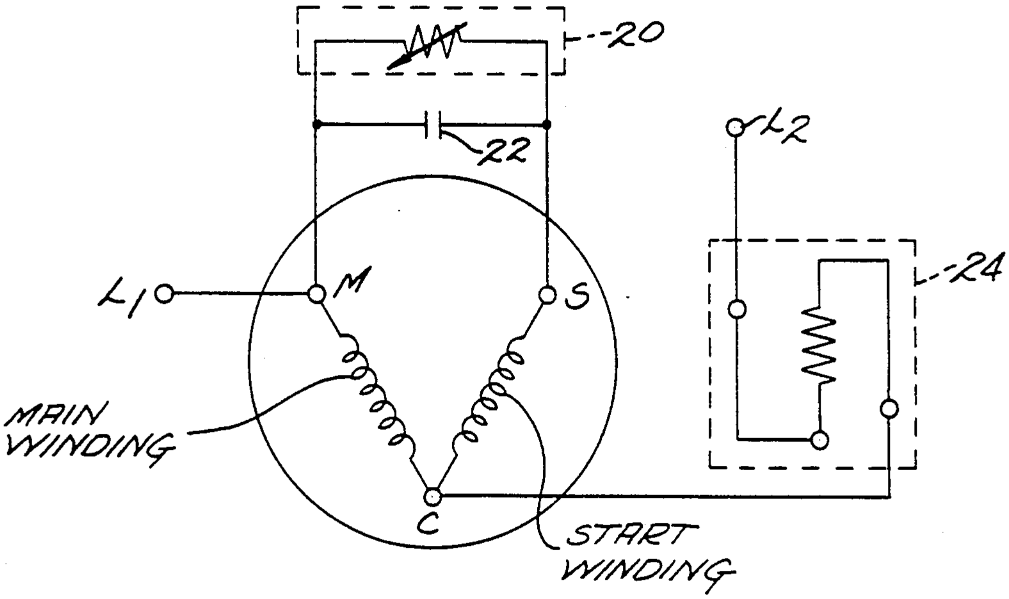
FIG. 3 is a circuit diagram of a typical motor winding system.

With reference to FIG. 3, a conventional wiring diagram of a motor includes a start device 20, such as a PTC starter as disclosed in U.S. Pat. No. 4,241,370, which is coupled across the main winding terminal M and start winding terminal S. A capacitor 22 optionally may be connected in parallel with the start device. Also connected to main winding terminal M is line $L_1$. A motor protector 24 is connected to common terminal C and to line $L_2$.

When the motor is energized the start device exhibits low resistance so that both the main and start windings are energized. As the motor reaches running speed the resistance of the start device rises dramatically to, in effect, deenergize the start winding. Should an overcurrent of a selected magnitude occur motor protector 24 will be actuated to open the circuit and deenergize the motor.

Figure 4:
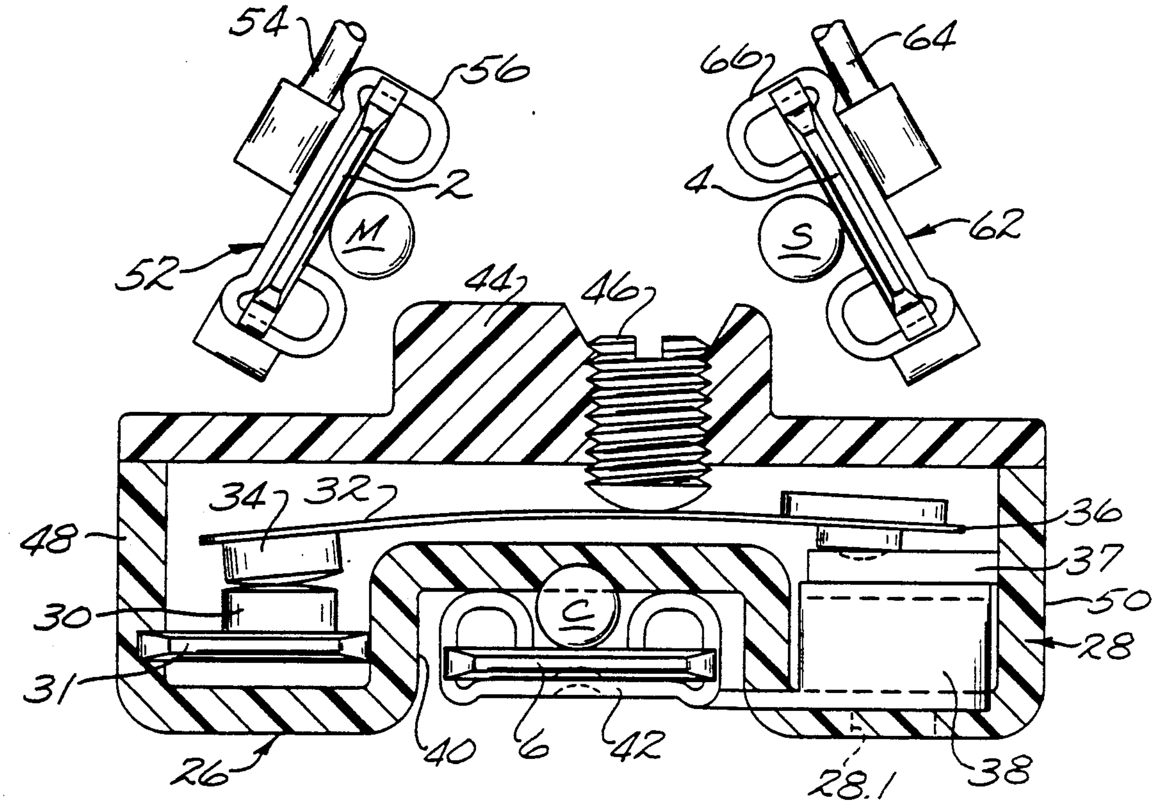
FIG. 4 is a top view of a header terminal pin arrangement showing a first embodiment of the present invention with a motor protector shown in cross section.
Figure 7:
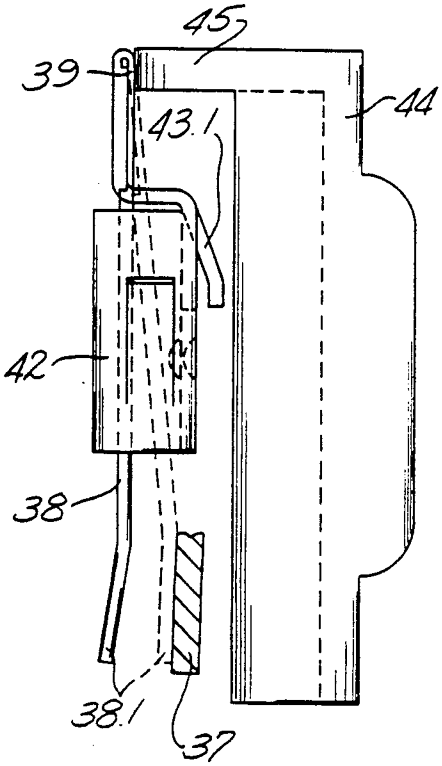
FIG. 7 is a side view of the FIG. 6 connector, and also showing a portion of the protector housing and thermostatic disc support.
Figure 8:
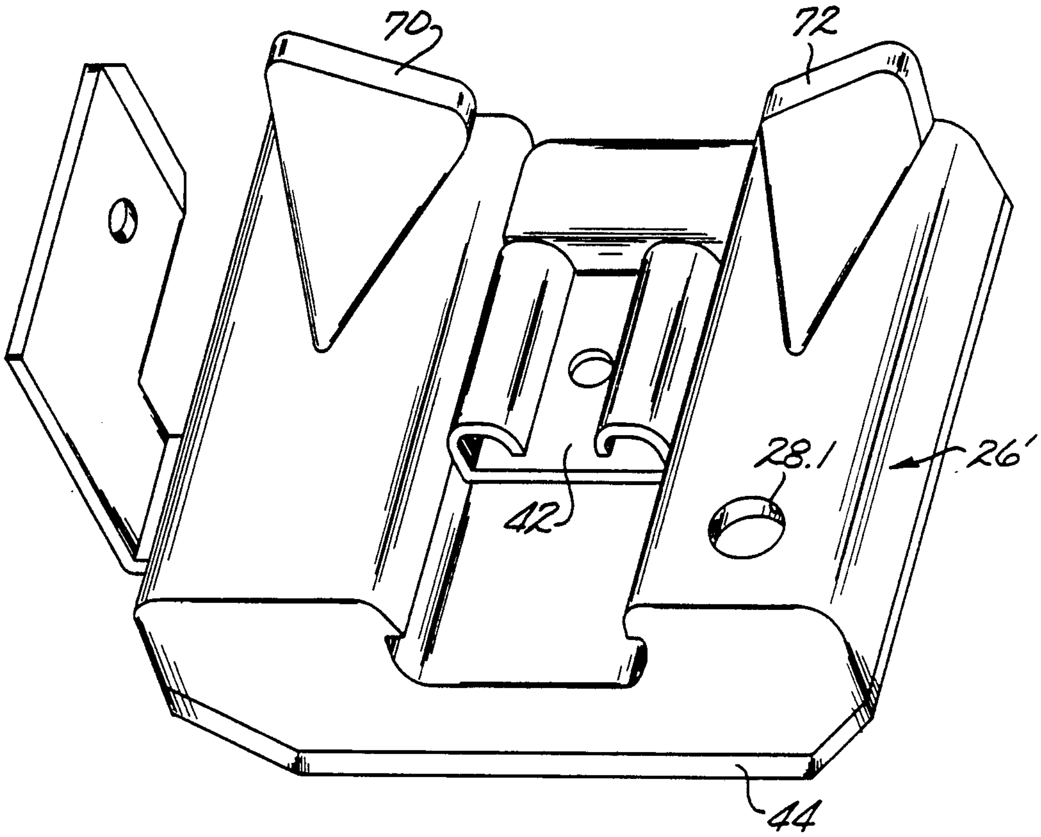
FIG. 8 is a perspective view of a motor protector according to a second embodiment of the system.

If the lead wires should be connected to the wrong terminal pins the motor will not function as intended. For example, if the main and start connections are reversed the motor may not start. In accordance with the invention the chance of miswiring is obviated. As seen in FIG. 4 a motor protector 26 is generally in the form of a parallelepiped housing having a cup shaped base member 28 with a channel-like recess 40 extending along a wall of the base member. A stationary electrical contact 30 is mounted in the base, connected to a spade terminal 31 extending out of base member 28 which is adapted for connection to line $L_2$. A snap acting bimetallic disc 32 has a movable contact 34 mounted at a free end of the disc and has an opposite end 36 attached, as by welding, to disc support 37, made of suitable electrically and thermally conductive material such as brass. A Fail safe spring arm 38 is formed integrally with a female quick connector 42 of electrically conductive material having good spring characteristics, such as beryllium copper. Arm 38 has a coined portion 39 which is bent back on itself as best seen in FIG. 7 and has a distal free end 38.1 formed at a slight angle with the remainder of the arm so that, when biased toward support 37, it is flush therewith as shown in dashed lines in FIG. 7. An aperture 28.1 as shown in FIG. 4, is provided in base 28 so that a probe can be inserted to bias arm 38 into contact with support 37 which is soldered thereto using a solder which melts at a selected temperature. The temperature is selected to prevent damage to the compressor motor upon overheating due to locked rotor conditions or the like, in the event that contact 34 does not separate from stationary contact 30 as intended.

Cover 44 received over base member 28 has a leg portion 45 which clamps the coined portion 39 against the closed, front wall of base member 26 to provide a force on arm 38 urging distal end portion 38.1 to move toward the solid line position of FIG. 7. Thus in the event that an overtemperature condition occurs sufficient to melt the solder bond between portion 38.1 and support 37, arm 38 will separate from support 37 to interrupt the circuit and deenergize the motor.

Cover 44, as seen in FIG. 4, mounts a calibrating screw 46 which is adapted to engage the formed portion of disc 32 between the cantilever mounting of the disc and its mid-length close to the mid-length. Displacement of the disc by the screw will lower the temperature at which the disc will snap to an open circuit condition.

Base 28 in cross section is generally U-shaped, having a recessed central portion 40 as shown in FIG. 4. Connector 42 is received in recessed portion 40 with tabs 43 and 43.1 received in mating slots in the base member to lock the connector thereto.

The spade terminal 6 welded to pin C is preferably keyed so that the protector can be received only on terminal C. For example, the width of spade 6 could be 0.210" and the width of spade 2 (main) and spade 4 (start) could be 0.250".

Figure 5:
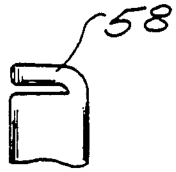
FIG. 5 is a broken away view of a female flag quick connector used in the FIG. 4 embodiment.
Figure 6:
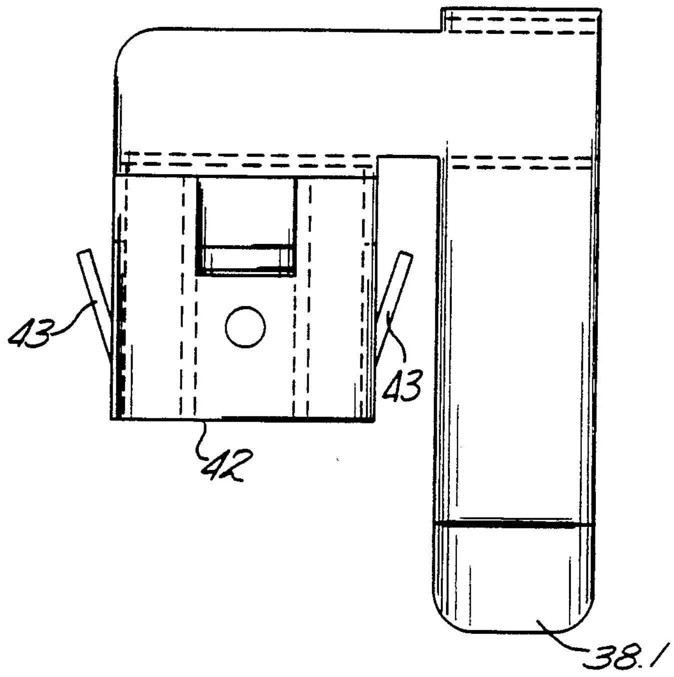
FIG. 6 is a front elevational view of a female quick connector and fail safe spring arm used in the FIG. 4 system.

Connector 42 is disposed so that it is essentially aligned with the bottom wall portion of base member 28 centrally between side walls 48, 50. As seen in FIG. 4, when placed on terminal C the protector housing occupies the majority of the space defined by the pin terminals. That is, an imaginary line joining the three pins defines a given area and the protector housing overlaps a majority of that area. Further, the protector housing intersects the planes in which the spade connectors 2 and 4 attached to pins M and S lie. This arrangement precludes the use of normal right angle female flag quick connectors for terminals M and S due to the fact that the protector housing would interfere with at least one of the lead wires. In accordance with the invention the female flag quick connectors which are intended to be connected to the spade terminals 2 and 4 attached to pins M and S are formed to be mirror images of each other having a right and a left hand lead orientation. That is, one connector 52 has a channel like opening which receives a spade connector along a longitudinal axis and has a lead wire 54 attached to connector 52 so that lead wire 54 extends laterally from side 56 (e.g. right side) of connector 52 and perpendicularly to the longitudinal axis of the opening. A top 58 (FIG. 5) extends over the spade receiving opening so that the spade can be received in the opening only from one direction. Connector 62, on the other hand, has a lead wire 64 attached thereto so that it extends laterally from side 66 (e.g. left side) and perpendicularly to the longitudinal axis of the opening. Connector 62 also is provided with a top portion to close the top end of the spade receiving opening.

Figure 9:
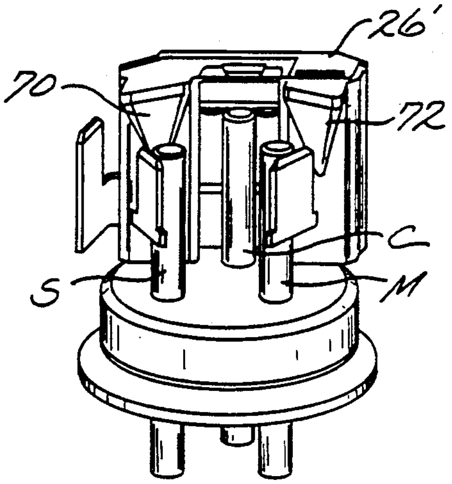
FIGS. 9 and 10 are a perspective view and a top view respectively, of the FIG. 8 motor protector mounted on the common pin of a compressor.
Figure 10:
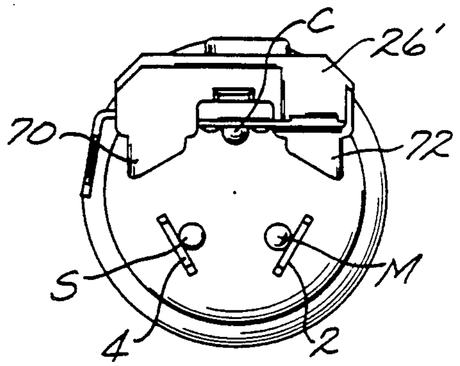
Figure 11:
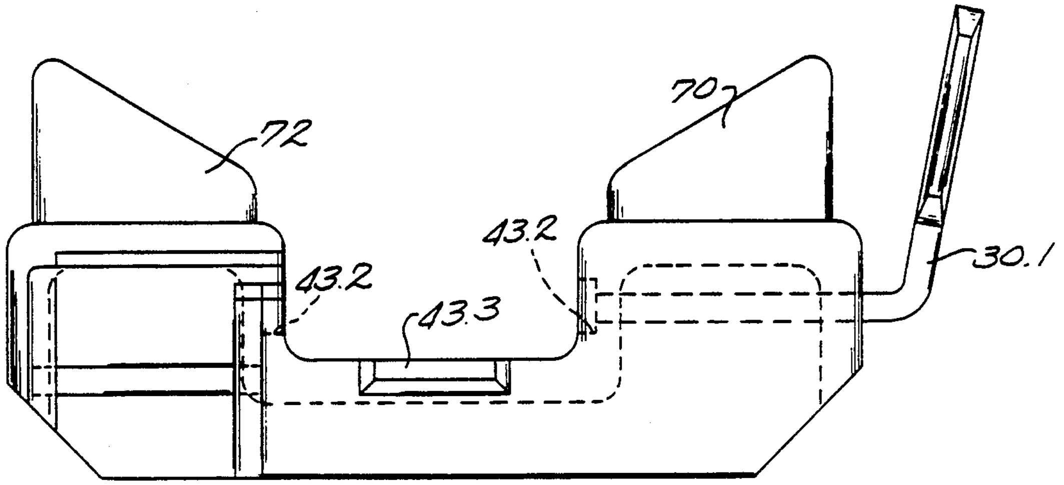
FIGS. 11 and 12 are respective top and front views of the FIG. 8 motor protector with the cover removed and without the thermostatic disc.
Figure 12:
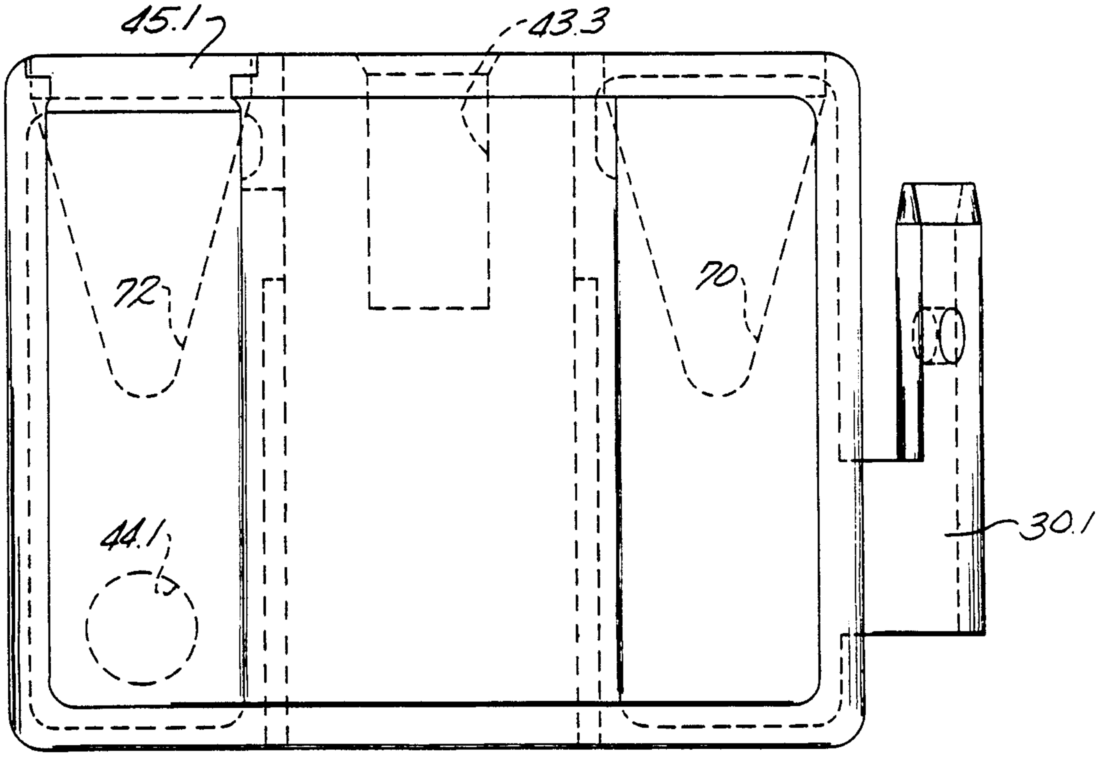

FIGS. 8–12 show a second embodiment of the invention in which the motor protector has a modified housing which serves the same purpose of preventing miswiring of the terminal pins. Housing 26' comprises the same structure as that shown in FIG. 4 except that a pair of protrusions 70, 72 project outwardly from a wall of the protector. As seen in FIGS. 9 and 10 the protector 26' is mounted on the spade terminal attached to pin C, with the main portion of the protector housing disposed outside the space defined by the intersection of planes in which two of pins C, M and S lie, in contradistinction to the arrangement shown in FIG. 4, where the protector housing occupied the majority of such space. However, protrusions 70, 72 project toward pins S and M respectively and intersect the respective planes in which blade terminals lie, to interfere with right angle female connectors placed on spade terminals 2 and 4 of pins M and S which do not have the correct polarization.

It will be appreciated that different forms of connectors can be employed to mount a motor protector on a room air conditioner compressor; however, the female quick connector shown mounted on the male spade terminal 6 offers the advantage of an inherent anti-rotation mechanism. Another advantageous configuration would be a male spade connector extending from the motor protector, and a double ended female quick connect can be used to interface between the spade terminal attached to pin C and the spade terminal of the motor protector.

Though the invention has been described with respect to specific preferred embodiments thereof, variations and modifications will become apparent to those skilled in the art. It is therefore the intention that the appended claims be interpreted as broadly as possible in view of the prior art to include all such variations and modifications.

We claim:

1. A single phase motor hermetically sealed within a compressor housing, a header mounted in a wall of the housing, first, second and third terminal pins for providing electrical connection to the motor mounted in the header equidistant from one another and forming an imaginary triangle, the pins extending from within to without the housing, within the housing the first pin being connected to the start winding of the motor, the second pin being connected to the main winding of the motor and the third pin being connected to common, a spade terminal welded to each pin without the housing, a motor protector having a housing and having a spade receiving terminal, the motor protector mounted on the header with the spade terminal connected to the third pin received in the spade receiving terminal, the housing extending from the third pin toward the first and second pins and occupying a majority of the space defined by the imaginary triangle.

2. A single phase motor according to claim 1 further including first and second spade receiving quick connectors having a channel like opening extending along a longitudinal axis and having a closed top and an open bottom for reception of spade terminals through the bottom into the channel like opening, a wire lead connected to each quick connector and extending generally laterally from a side thereof and perpendicularly to the longitudinal axis in mirror image of one another to provide polarized right and left oriented connectors whereby when the motor protector is received on the third pin the first spade receiving quick connector is receivable on only one of the first and second pins and the second spade receiving quick connector is received on only the other of the first and second pins.

3. A single phase motor according to claim 1 in which the spade terminals welded to each pin each lie in a plane and the planes intersect the wall of the compressor housing forming the imaginary triangle and the protector housing intersecting the plane in which the spade connectors attached to the first and second pins lie.

4. A single phase motor hermetically sealed within a compressor housing, a header mounted in a wall of the housing, first, second and third terminal pins for providing electrical connection to the motor mounted in the header equidistant from one another and forming an imaginary triangle, the pins extending from within to without the housing, within the housing the first pin being connected to the start winding of the motor, the second pin being connected to the main winding of the motor and the third pin being connected to common, a spade terminal welded to each pin without the housing, the spade terminals each lying in a plane with the planes intersecting one another and with the header to form an equilateral triangle on a surface of the header, a motor protector having a housing and having a spade receiving terminal, the motor protector mounted on the header with the spade terminal connected to the third pin received in the spade receiving terminal, a pair of protrusions extending from the housing toward the first and second pins respectively intersecting the planes in which the spade terminals attached to the first and second pins lie.

5. A single phase motor according to claim 4 further including first and second spade receiving quick connectors having a channel like opening extending along a longitudinal axis and having a closed top and an open bottom for reception of spade terminals through the bottom into the channel like opening, a wire lead connected to each quick connector and extending generally laterally from a side thereof and perpendicularly to the longitudinal axis in mirror image of one another to provide polarized right and left oriented connectors whereby when the motor protector is received on the third pin the first spade receiving quick connector is receivable on only one of the first and second pins and the second spade receiving quick connector is received on only the other of the first and second pins.

6. A single phase motor according to claim 1 in which the motor protector has a cup shaped base member, a channel like opening extending along a wall of the base member, a stationary contact mounted in the base member, a snap acting thermostatic disc having a movable contact mounted thereon adapted to move into and out of engagement with the stationary contact, a combination connector/spring member having a connector end received in the channel like opening and the spring member extending through an opening in a wall of the base member into the interior of the base member, the connector/spring member having an elongated arm with a distal free end, a support member received in the base member having a first surface on which the snap acting thermostatic disc is mounted and a second surface to which the distal free end is soldered using a solder which melts at a selected temperature, a cover received on the base, the cover having a leg portion which clamps the spring arm placing a bias in it tending to separate the distal end from the second surface.

7. A motor protector comprising a cup shaped base member, a stationary contact mounted in the base member, a snap acting thermostatic disc having a movable contact mounted thereon adapted to move into and out of engagement with the stationary contact, a combination connector/spring member having a connector end disposed externally of the base member and extending through an opening in a wall of the base member into the base member, the connector/spring member having an elongated arm with a distal free end, a support member received in the base member having a first surface on which the snap acting thermostatic disc is mounted and a second surface to which the distal free end is soldered using a solder which melts at a selected temperature, the arm clamped in the base member placing a bias on the distal end tending to separate the distal end from the second surface.

8. A motor protector according to claim 7 further including a calibration screw movably adjustable to selectively deform the thermostatic disc to adjust the opening temperature of the disc.

9. A single phase motor according to claim 6 in which the motor protector includes a calibration screw movably adjustable to selectively deform the thermostatic disc to adjust the opening temperature of the disc.

* * * * *